Patented Aug. 14, 1945

2,382,813

UNITED STATES PATENT OFFICE 2,382,813

VULCANIZATION OF RUBBER

Philip T. Paul, Naugatuck, Conn., assignor to United States Rubber Company, New York, N. Y., a corporation of New Jersey No Drawing. Application August 31, 1944, Serial No. 552,206

10 Claims. (Cl. 260—795)

This invention relates to the vulcanization of rubber and similar sulfur-vulcanizable rubber-like materials, by an improved process employing a new accelerator mix.

In the past, various organic accelerators containing at least one of the elements, nitrogen or sulfur, in chemical combination, have been used. Frequently, their use, particularly of the nitrogen-containing accelerators, has been attended by incipient vulcanization, known as burning or scorching.

I have found that certain aryl sulfenamides, which ordinarily alone have no substantial accelerating power, particularly in carbon black stocks—nevertheless will retard the action of the nitrogen-containing vulcanization accelerators at relatively low temperatures (room and milling temperatures), and will increase their strength, by activation, at the higher curing temperatures. Such sulfenamides have the property of delayed action activators, since for a given amount of acceleration, they impart to a combination, including them and a primary accelerator of vulcanization, less activity at low temperatures than at the high temperatures.

These delayed action activators of the present invention subscribe to the general formula Aryl—S—$NH_2$ where aryl represents an aromatic nucleus of the benzene, or naphthalene series, having a nuclear carbon atom directly attached to the S (sulfur), and which nucleus is further substituted by an electro-negative group, e. g., halogen, nitro, acyl, carboxyl (—COOH), carboxy ester, sulfonamide, carbonyl amido, cyano (—CN), nitro alkylene, etc. Exemplary of acyl is such as $CH_3CO$—; of carboxy ester, such as —$COO.CH_3$; of sulfonamide, such as —$SO_2.NH_2$; of carbonyl amido, such as —$CO.NH_2$; of nitro alkylene, such as —$CH_2.NO_2$. The electro-negative group also operates to stabilize the chemical, which in turn allows processing with a reduction in the danger of decomposition of the chemical, before the vulcanization.

Exemplary of preferred sulfenamides are:

o-Cyano phenyl sulfenamide
o-Nitro phenyl sulfenamide
m-Nitro phenyl sulfenamide
p-Nitro phenyl sulfenamide
o-Fluoro phenyl sulfenamide
m-Fluoro phenyl sulfenamide
p-Fluoro phenyl sulfenamide
2,5-dichlorophenyl sulfenamide
2,3,5-trichloro phenyl sulfenamide
1-nitro naphthalene 2-sulfenamide
2-nitro naphthalene 1-sulfenamide
1,4-dichloro naphthalene 2-sulfenamide
o-Carboxy phenyl sulfenamide
p-Acetyl phenyl sulfenamide
p-Ethyl-carboxy phenyl sulfenamide
p-Chloro o-acetyl phenyl sulfenamide
2-methyl 4-nitro phenyl sulfenamide
2-phenyl 4-nitro phenyl sulfenamide
4-ter.butyl 2-nitro phenyl sulfenamide
o-Sulfonamido phenyl sulfenamide Among the useful nitrogen-containing accelerators, employable with any of the above sulfenamides, are the following:

Acetaldehyde-aniline condensation products
Acetaldehyde-butyraldehyde-aniline product
Acetaldehyde-formaldehyde-aniline product
Acetaldehyde-p-toluidine-aniline product
Alpha-ethyl beta-propyl acrolein-aniline product
Tributylidene aniline
Butyraldehyde-monobutylamine product
Formaldehyde-aniline product
Formaldehyde-monoethyl amine product
Formaldehyde-para toluidine product
Diphenyl guanidine
Di ortho tolyl guanidine
Triphenyl guanidine
2-mercapto thiazole
4,5-dimethyl 2-mercapto thiazole
4-ethyl 2-mercapto thiazole
2-mercapto benzothiazole
2,2'-benzothiazole disulfide
Zinc 2-benzothiazole sulfide
Dinitrophenyl 2-benzothiazole sulfide
Phenyl amino methyl 2-benzothiazyl sulfide
Bis-N,N' (2-benzothiazyl thiomethyl) urea
Benzoyl 2-benzothiazyl sulfide
Benzothiazyl 2-monocyclohexyl sulfenamide
2-mercapto thiazoline
2-mercapto 4-methyl thiazoline
Tetramethyl thiuram monosulfide
Tetramethyl thiuram disulfide
Zinc dimethyl dithiocarbamate
Tetra ethyl thiuram disulfide
Lead dimethyl dithiocarbamate The use of these materials as delayed action activators for the primary vulcanization accelerators in addition to imparting a more favorable scorch factor also allows greater freedom of compounding variation. By varying the ratios of accelerator and activator it is possible to obtain a series of combinations which vary in scorch and curing properties. Indeed, in some cases it may be found desirable to use a preponderance of the activator so as to have a rubber stock that is extremely safe and yet not too highly cured. Consequently, the ratio of activator to accelerator is to be chosen, dependent on the type of rubber (natural or synthetic), type of stock (white stock, tread stock, etc.), temperature of cure, time of cure, the particular primary accelerator, for example, in the case of mercapto benzothiazole (Captax) the proportion of activator generally ranges from 25 to 200% by weight, based on the weight of the Captax, and lastly the objectives of the compounder, i. e., whether he desires to provide a low or high modulus stock, to provide for a short or a long cure, etc.

For the tests given below, the ortho and para, nitro phenyl sulfenamides may be prepared by the action of anhydrous ammonia on the corresponding nitrophenyl sulfur chloride according to the method of Zincke & Farr, Annalen 391, 57–88 (1912). The 4-chloro 2-nitrophenyl sulfenamide (M. P. 126–127° C.) may be prepared according to the method of Zincke et al., Annalen 416, 86–112 (1918).

The 2,4-dinitrophenyl sulfenamide (M. P. 119–120° C.) may be prepared from 2,4-dinitro thiophenol and monochloramine in the water solution; these reagents react at 0° C. to form the said sulfenamide which can be filtered off and washed with water.

The 2,5-dichlorophenyl sulfenamide (M. P. 61–62° C.) may be prepared from 2,5-dichloro thiophenol and monochloramine, in the same manner as the preceding chemical.

The following examples, in which the parts are by weight, are given to illustrate the invention:

EXAMPLE 1

*Master batch—A*

| | |
|---|---:|
| Smoked sheet | 100 |
| Carbon black | 45 |
| Zinc laurate | 3.5 |
| Pine tar | 3.5 |
| Zinc oxide | 5.0 |
| Sulfur | 3.0 |
| Acetone-diphenylamine condensate (antioxidant) | 1.0 |
| | 161.0 |

| | A | B | C | D | E | F |
|---|---|---|---|---|---|---|
| Master batch A | 161 | 161 | 161 | 161 | 161 | 161 |
| Mercaptobenzothiazole | 1.0 | 0.65 | 0.65 | | | |
| o-Nitrophenyl sulfenamide | | 0.35 | | 0.65 | | 0.35 |
| Benzothiazyl 2-mono-cyclohexyl sulfenamide | | | | 0.45 | 0.35 | |

*Cured 45 minutes at 30 pounds per square inch steam pressure*

| Percent elongation (E) | A | B | C | D | E | F |
|---|---|---|---|---|---|---|
| 300 | 820 | 720 | 610 | 690 | 710 | No cure. |
| 500 | 2,175 | 2,000 | 1,900 | 1,840 | 1,820 | |
| Break | 3,500-670 | 3,480-680 | 3,050-643 | 2,900-690 | 2,890-686 | |

*Scorch tests 120 minutes at 5 pounds per square inch steam pressure*

| A | | B | | C | | D | | E | | F |
|---|---|---|---|---|---|---|---|---|---|---|
| T | E | T | E | T | E | T | E | T | E | |
| 1,607 | 612 | 240 | 805 | 962 | 632 | 733 | 753 | 50 | 1,076 | No cure. |

T means tensile strength in pounds per square inch.

EXAMPLE 2

*Master batch—B*

| | |
|---|---:|
| Pale crepe | 100 |
| Zinc oxide | 10 |
| Whiting | 60 |
| Lithopone | 60 |
| Zinc laurate | 0.5 |
| Sulfur | 3 |
| | 233.5 |

| | G | H | I | J | K | L |
|---|---|---|---|---|---|---|
| Master batch-B | 233.5 | 233.5 | 233.5 | 233.5 | 233.5 | 233.5 |
| Dibenzothiazyl disulfide | 1.0 | 0.5 | | | | |
| o-Nitrophenyl sulfenamide | | 0.35 | | 0.35 | | 0.35 |
| Phenyl amino methyl 2-benzothiazyl sulfide | | | 1.0 | .5 | | |
| 2-mercapto thiazoline | | | | | 1.0 | 0.7 |

*Cured 30 minutes at 30 pounds per square inch steam pressure*

| Percent elongation (E) | G | H | I | J | K | L |
|---|---|---|---|---|---|---|
| 300 | 400 | 400 | 380 | 370 | 275 | 270 |
| 500 | 1,230 | 1,225 | 1,150 | 1,230 | 900 | 1,000 |
| Break | 2,530-655 | 2,260-670 | 2,260-655 | 2,350-645 | 1,690-650 | 2,600-670 |

*Scorch tests 75 minutes at 5 pounds per square inch steam pressure*

| G | | H | | I | | J | | K | | L | |
|---|---|---|---|---|---|---|---|---|---|---|---|
| T | E | T | E | T | E | T | E | T | E | T | E |
| 80 | 947 | 90 | 1,330 | 2,440 | 750 | 1,380 | 850 | 486 | 780 | 146 | 1,030 |

EXAMPLE 3

| | M | N | O | P |
|---|---|---|---|---|
| Master batch—B | 233.5 | 233.5 | 233.5 | 233.5 |
| Thiazole mixture | 1.0 | 0.5 | | |
| o-Nitrophenyl sulfenamide | | 0.35 | | 0.35 |
| Benzoyl 2-benzothiazyl sulfide | | | 1.6 | 0.8 |

Thiazole mixture is a mixture of bis-4,5-dimethyl thiazyl disulfide (85%) and bis-4,5-dimethyl thiazyl disulfide (15%).

*Cured 45 minutes at 30 pounds per square inch steam pressure*

| Percent elongation (E) | M | N | O | P |
|---|---|---|---|---|
| 300 | 450 | 360 | 450 | 450 |
| 500 | 1,275 | 1,230 | 1,200 | 1,880 |
| Break | 2,160–630 | 2,140–645 | 1,975 | 2,110–610 |

*Scorch tests 75 minutes at 5 pounds per square inch steam pressure*

| M | | N | | O | | P | |
|---|---|---|---|---|---|---|---|
| T | E | T | E | T | E | T | E |
| 233 | 740 | 000 | 1,166 | 1,910 | 743 | 1,090 | 713 |

Example 4

| | Q | R | S | T |
|---|---|---|---|---|
| Master batch—B | 233.5 | 233.5 | 233.5 | 233.5 |
| Tetramethyl thiuram monosulfide | 0.16 | 0.08 | | |
| o-Nitrophenyl sulfenamide | | 0.35 | | 0.35 |
| Butyraldehyde-aniline condensate | | | 0.5 | 0.25 |

*Cured 45 minutes at 30 pounds per square inch steam pressure*

| Per cent elongation (E) | Q | R | S | T |
|---|---|---|---|---|
| 300 | 200 | 300 | 380 | 300 |
| 500 | 600 | 930 | 1,320 | 1,150 |
| Break | 1,700–696 | 2,000–663 | 2,230–810 | 2,200–643 |

*Scorch tests 30 minutes at 5 pounds per square inch steam pressure*

| Q | | R | | S | | T | |
|---|---|---|---|---|---|---|---|
| T | E | T | E | T | E | T | E |
| 1,606 | 730 | 100 | 1,236 | 263 | 993 | 000 | 1,900 |

Example 5

| | U | V |
|---|---|---|
| Master batch A | 161 | 161 |
| p-Nitrophenyl sulfenamide | | 0.35 |
| Mercaptobenzothiazole | 1.0 | 0.65 |

*Cured 45 minutes at 30 pounds per square inch steam pressure*

| Per cent elongation (E) | U | V |
|---|---|---|
| 300 | 875 | 830 |
| 500 | 2,100 | 2,030 |
| Break | 3,090–656 | 3,090–680 |

*Scorch tests 105 minutes at 5 pounds per square inch steam pressure*

| U | | V | |
|---|---|---|---|
| T | E | T | E |
| 1,086 | 680 | 483 | 730 |

Example 6

| | W | X | Y | Z |
|---|---|---|---|---|
| Master batch A | 161.0 | 161.0 | 161.0 | 161.0 |
| Diphenyl guanidine | | | 3.0 | 3.0 |
| 2,5-dichlorophenyl sulfenamide | | .40 | | |
| Mercaptobenzothiazole | 1.0 | .65 | | |
| o-Nitrophenyl sulfenamide | | | | 0.4 |

*Cured 60 minutes at 30 pounds per square inch steam pressure*

| Percent elongation (E) | W | X | Y | Z |
|---|---|---|---|---|
| 300 | 1,100 | 950 | 900 | 980 |
| 500 | 2,510 | 2,230 | 2,300 | 2,150 |
| Break | 3,100–590 | 3,000–600 | 3,190–610 | 3,230–663 |

*Scorch tests 105 minutes at 5 pounds per square inch steam pressure*

| W | | X | | Y | | Z | |
|---|---|---|---|---|---|---|---|
| T | E | T | E | T | E | T | E |
| 990 | 556 | 73 | 823 | 537 | 803 | 370 | 840 |

Example 7

| | A′ | B′ |
|---|---|---|
| Master batch A | 161.0 | 161.0 |
| Mercaptobenzothiazole | 0.5 | 1.0 |
| 2-nitro 4-chloro phenyl sulfenamide | 0.42 | |

*Cured 60 minutes at 30 pounds per square inch steam pressure*

| Percent elongation (E) | A′ | B′ |
|---|---|---|
| 300 | 900 | 1,030 |
| 500 | 2,490 | 2,680 |
| Break | 3,120–616 | 3,020–556 |

*Scorch tests 105 minutes at 5 pounds per square inch steam pressure*

| A′ | | B′ | |
|---|---|---|---|
| T | E | T | E |
| 1,055 | 720 | 1,883 | 686 |

It is to be understood that the term "a rubber" is employed in the claims in a generic sense to refer to natural as well as synthetic rubbers which are capable of vulcanization when heated with sulfur, and includes caoutchouc, balata, gutta percha, polybutadienes, and modified polybutadienes, such as GRS and GRN (respectively, butadiene-styrene copolymer rubber, and butadiene-acrylo-nitrile copolymer rubber), as well as latices and reclaims of such materials, whether or not admixed with pigments, fillers, softeners, antioxidants, etc.

Other ratios of the compounding ingredients than those mentioned in the examples given, as well as other well-known fillers, pigments, etc., may be employed in the production of various types of rubber compounds, and are apparent to

Having thus described my invention, what I claim and desire to protect by Letters Patent is:

1. A method of vulcanizing a rubber which comprises incorporating therein sulfur, a primary organic rubber-vulcanization accelerator, and a compound having the general formula Aryl—S—NH₂ where aryl represents an aromatic nucleus of the group consisting of the benzene and naphthalene series, having a nuclear carbon atom directly bonded to the S, and which nucleus is further substituted by an electro-negative group.

2. A method of vulcanizing a rubber which comprises incorporating therein sulfur, a primary organic rubber-vulcanization nitrogen-containing accelerator, and a compound having the general formula Aryl—S—NH₂ where aryl represents an aromatic nucleus of the group consisting of the benzene and naphthalene series, having a nuclear carbon atom directly bonded to the S, which nucleus is further substituted by an electro-negative group, and heating the mix.

3. A method of vulcanizing a rubber which comprises incorporating therein sulfur, a primary organic rubber-vulcanization accelerator, and ortho-nitrophenyl sulfenamide having the formula

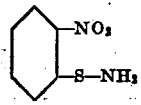

4. A method of vulcanizing a rubber which comprises incorporating therein sulfur, a primary organic rubber-vulcanization nitrogen-containing accelerator, and ortho-nitrophenyl sulfenamide having the formula

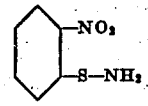

and heating the mix.

5. A method of vulcanizing a rubber which comprises incorporating therein sulfur, a primary organic rubber-vulcanization accelerator, and 2,5-dichloro phenyl sulfenamide having the formula

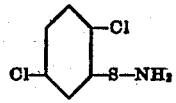

6. A rubber composition containing a primary organic rubber-vulcanization accelerator, and a compound having the general formula Aryl—S—NH₂ where aryl represents an aromatic nucleus of the group consisting of the benzene and naphthalene series, having a nuclear carbon atom directly bonded to the S, and which nucleus is further substituted by an electro-negative group.

7. A rubber composition containing a primary organic rubber-vulcanization nitrogen-containing accelerator, and a compound having the general formula Aryl—S—NH₂ where aryl represents an aromatic nucleus of the group consisting of the benzene and naphthalene series, having a nuclear carbon atom directly bonded to the S, which nucleus is further substituted by an electro-negative group, and heating the mix.

8. A rubber composition containing a primary organic rubber-vulcanization accelerator, and ortho-nitrophenyl sulfenamide having the formula

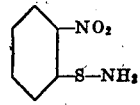

9. A rubber composition containing a primary organic rubber-vulcanization nitrogen-containing accelerator, and ortho-nitrophenyl sulfenamide having the formula

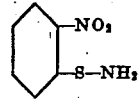

and heating the mix.

10. A rubber composition containing a primary organic rubber-vulcanization accelerator, and 2,5-dichloro phenyl sulfenamide having the formula

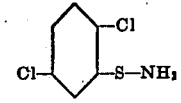

PHILIP T. PAUL.